United States Patent [19]

Szydlowski et al.

[11] Patent Number: 4,976,747
[45] Date of Patent: Dec. 11, 1990

[54] FUEL TREATMENT APPARATUS FOR FUEL CELLS

[75] Inventors: Donald F. Szydlowski, Ellington; Roger R. Lesieur, Enfield, both of Conn.

[73] Assignee: International Fuel Cells Corporation, South Windsor, Conn.

[21] Appl. No.: 419,880

[22] Filed: Oct. 10, 1989

[51] Int. Cl.⁵ .............................................. B01J 12/00
[52] U.S. Cl. .................................. 48/127.9; 422/190; 429/19
[58] Field of Search ................ 48/127.7, 127.9, 198.1, 48/214 A, 94; 429/17, 19; 422/190, 220; 423/219, 230, 650, 651, 652

[56] References Cited

U.S. PATENT DOCUMENTS

| | | | |
|---|---|---|---|
| 3,476,534 | 11/1969 | Buswell et al. | 48/214 A |
| 3,477,832 | 11/1969 | Mayland et al. | 48/214 A |
| 3,551,124 | 12/1970 | Owaki et al. | 48/214 A |
| 4,181,503 | 1/1980 | Lesieur et al. | 48/196 A |

Primary Examiner—Peter Kratz
Attorney, Agent, or Firm—Edward L. Kochey, Jr.

[57] ABSTRACT

An oxidizer (12) receives cool fresh fuel (10) and hot recycle fuel (14). The recycle fuel is mixed with only a portion of the fresh fuel in the catalytic bed (16). The remaining fresh fuel is progressively added within the bed. High temperature is achieved for local ignition. The exothermic reaction heats the later mixed fuel to the ignition temperature.

7 Claims, 2 Drawing Sheets

FUEL TREATMENT APPARATUS FOR FUEL CELLS

TECHNICAL FIELD

The invention relates to fuel cell reforming apparatus and in particular to the removal of oxygen from the fuel.

BACKGROUND OF THE INVENTION

Hydrocarbon gaseous fuel is conventionally used for fuel cells. This fuel is normally oxygen free, but may contain varying amounts of sulfur. In order to use the fuel within the fuel cell, the sulfur must be removed. The fuel is also reformed to increase the molecular hydrogen content of the fuel before using it in the fuel cell.

The gas supply is usually natural gas. During peak demand conditions on the fuel delivery system, additional gas such as propane is supplied in the fuel. Since this would increase the heating value, air is added to maintain the heating value at its normal level.

For most systems using natural gas, this peak shaved natural gas creates no problem. The oxygen content does, however, create a problem for the fuel treatment system for fuel cells. It must therefore be removed with the oxygen being consumed in a catalyzed reaction with hydrogen.

U.S. Pat. No. 4,181,503 illustrates most of the basic components of a prior art system. A portion of the reformed fuel is recycled and mixed with in-coming cold fuel to provide an ample molecular hydrogen concentration for subsequent reactions in the processing train. This fresh fuel along with the recycled portion is then passed to an oxidizer where the oxygen is consumed by reacting with the hydrogen in the presence of a catalyst. A minimum temperature is required for ignition, this temperature depending on the particular catalyst and whether or not the catalyst has been sulfided because of sulfur in the fuel. Once the reaction starts, any sulfur on the catalyst will be burned off.

If there is no oxygen present in the fuel, the temperature leaving the oxidizer will be the same as that entering. If oxygen is present, however, the exothermic reaction causes a temperature increase. This temperature increase is about 500° F. (260° C.) with 4 percent oxygen content. The temperature leaving the oxidizer is therefore a variable depending on the oxygen content of the fuel at any particular time.

From the oxidizer the fuel then enters the hydrodesulfurizer which converts sulfur in the fuel to $H_2S$. This hydrodesulfurizer requires a minimum temperature of 500° F. (260° C.) for the reaction, but at temperatures exceeding 650° F. (343° C.) the reaction reverses and accordingly these high temperatures cannot be tolerated.

Accordingly, in addition to the preheater, one or two heat exchangers are required between the oxidizer and the hydrodesulfurizer. Where the temperature entering the oxidizer is less than 500° F. (260° C.) with no oxygen present in the fuel, the temperature to the hydrodesulfurizer would be less than 500° F. (260° C.). Accordingly, a heat exchanger would be required to add heat to the fuel.

On the other hand, a 4 percent oxygen content will produce a 500° F. (260° C.) temperature increase in the oxidizer. Even operating at the upper limit of the hydrodesulfurizer this means that the maximum allowable temperature entering the oxidizer would be 150° F. (65° C.). This temperature cannot be depended on to initiate the oxidation reaction.

Continuing through the fuel treatment train an $H_2S$ removal apparatus removes the $H_2S$ from the gas.

Steam is added to the gas at a temperature level such as to produce greater than 600° F. (326° C.) gas steam mixture for entrance into the reform reactor. This steam is controlled to maintain a constant ratio with the fuel passing therethrough in accordance with the known system. The fuel and steam are fed into the reform reactor where, in the presence of a catalyst, additional hydrogen is formed. The exit temperature from the regenerative reform reactor is on the order of 700° F. (371° C.).

Heat is removed from the fuel stream to reduce the temperature to approximately 350° F. (176° C.) where the fuel enters a shift converter which increases the molecular hydrogen content of the fuel stream. The converted fuel exits at 450° F. (232° C.) with a portion being recycled and the remainder going to the fuel cells for use therein.

The prior art system where the entire fuel mixture is heated prior to entrance to the oxidizer requires multiple heat exchangers and complex operation.

SUMMARY OF THE INVENTION

The fuel reforming apparatus of the invention includes in a manner similar to the prior art an oxidizer containing a catalyst for catalyzing an oxidation consuming oxygen, this oxidizer having a minimum ignition temperature. A fuel supply supplies fuel to the oxidizer with the hydrodesulfurizer receiving fuel from the oxidizer. This converts sulfur to $H_2S$ which is removed in a following $H_2S$ removal device. A reform reactor receives fuel from this $H_2S$ removal device and supplies it to the fuel cells. A portion of the fuel leaving the reform reactor is recycled to a point upstream of the oxidizer to provide ample hydrogen for the reactions within the fuel treatment train.

The oxidizer of this invention, however, includes means for heating only a portion of the fresh fuel in the presence of the catalyst, and thereafter adds the remaining fresh fuel, also in the presence of catalyst. Accordingly, with no oxygen present, only a minor amount of heat is added and after dilution with the remaining fuel the temperature remains low. If there is oxygen in the fuel, however, the small portion which is heated initiates the oxidation reaction, with the exothermic reaction heating the remaining fresh fuel being added thereafter so that all of the oxygen is consumed. The outlet temperature in the presence of oxygen is reduced because only a portion of the fuel has been initially heated.

DESCRIPTION OF THE PREFERRED EMBODIMENT

Various typical temperatures are used in describing this system. It should be understood, however, that the particular temperature may vary depending on the catalyst being used and also that some limits are themselves not clearly delineated. While an ignition temperature either produces ignition or not, a limit on the upper temperature of the hydrodesulfurization apparatus is a vague limit, since there is no precise temperature where the reaction suddenly reverses. As one approaches the upper limit of such a system, the apparatus becomes increasing less effective.

Figure 1:
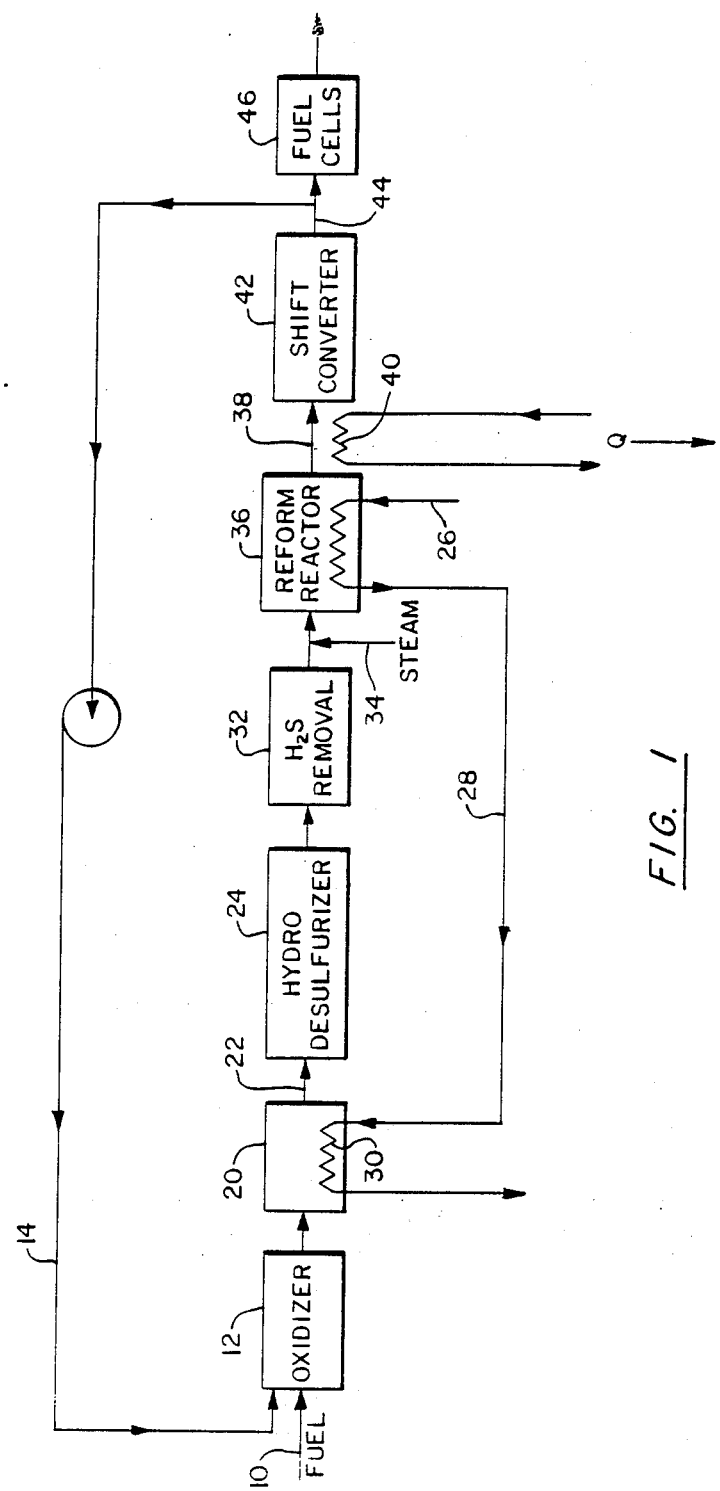
FIG. 1 is a schematic drawing of the fuel treatment system.
Figure 3:
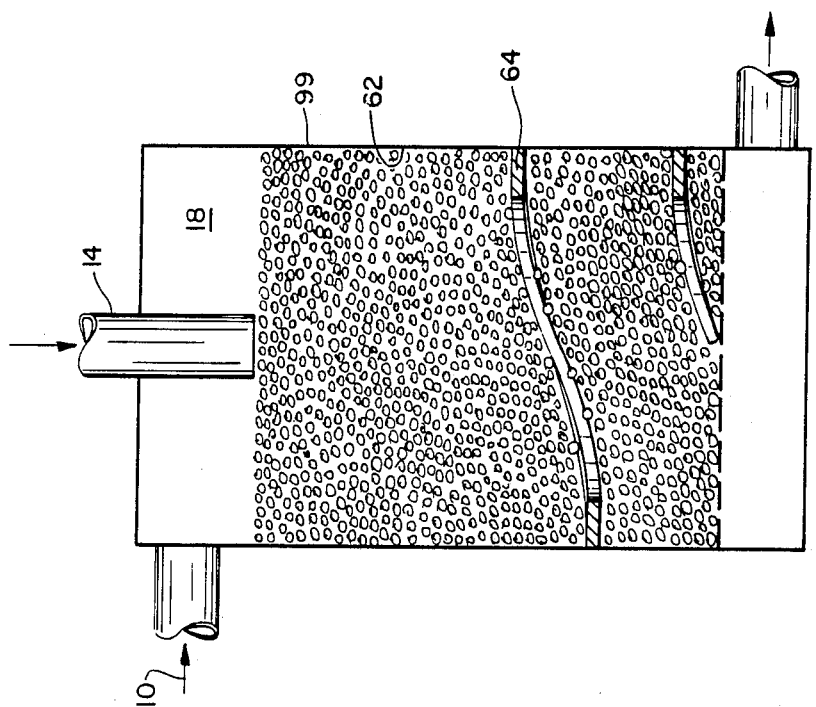
FIG. 3 is a sectional view of the oxidizer with mixing vanes.

Referring to FIG. 1, a supply of fuel 10 enters the oxidizer 12. Recycled fuel 14 independently enters the oxidizer. The fuel is at approximately 60° F. (20° C.) and the recycled flow is at 450° F. (232° C.). The ratio of flows is about three parts of fuel to one part of recycle.

Figure 2:
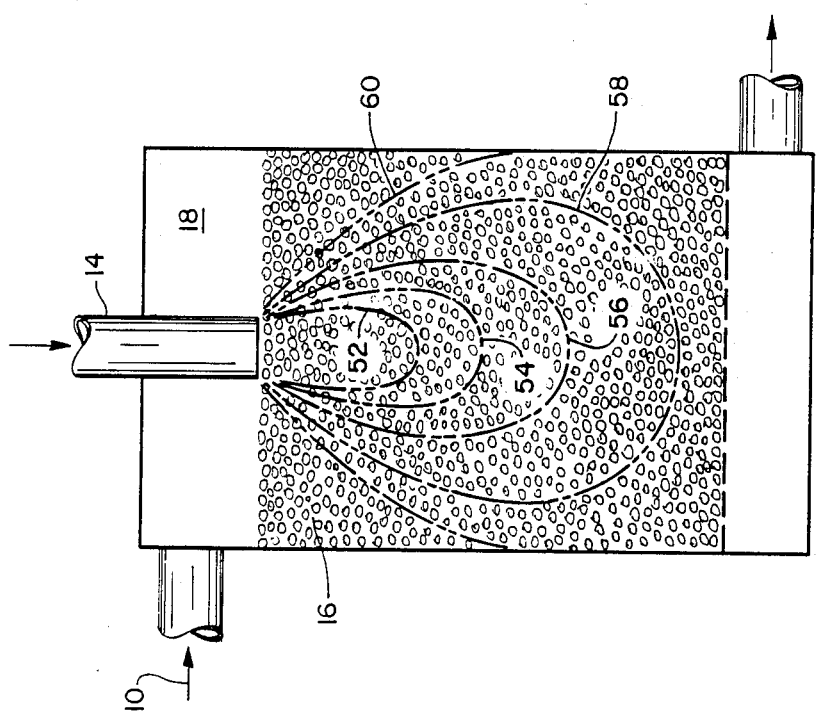
FIG. 2 is a sectional view of the oxidizer.

The oxidizer is a substantially cylindrical vessel as illustrated in FIG. 2 with the recycle flow 14 entering the catalytic bed 16 in a central location and with a fresh fuel 10 entering at a surrounding annular location 18. This catalyst will achieve auto ignition at a temperature of 175° F. (80° C.) if the catalyst is clean, or at 250° F. (120° C.) where the catalyst has been sulfided because of sulfur in the fuel. Once the oxidation reaction is started, the sulfur burns off returning the catalyst to the 175° F. (80° C.) autoignition temperature.

The mixed temperature of the recycle flow in the fresh fuel would be 140° F. (60° C.) if they were directly mixed together. With no oxygen in the fuel, this is the resulting temperature leaving the oxidizer since they are effectively just mixed together within the oxidizer.

A heat exchanger 20 is supplied to heat the fuel to 500° F. (260° C.) at location 22 prior to entrance of the hydrodesulfurizer. This is the minimum temperature required for appropriate operation of the hydrodesulfurizer 24.

Fuel comprised substantially of the excess hydrogen containing effluent from the fuel cells is fired at location 26 into the reform reactor with the exit gas 28 being used to supply heat through the heating side 30 of the heat exchanger 20.

The temperature leaving the hydrodesulfurizer is also 500° F. (260° C.). It is noted, however, that should there have been any oxygen not consumed in the oxidizer, it would be consumed at this time in the hydrodesulfurizer. This would result in a temperature increase within this apparatus which would be detrimental should it result in an increase of more than 100° to 150° F. (56° to 83° C.). This is equivalent to an oxygen content of from 0.8 to 1.2 percent.

The fuel is then passed to the $H_2S$ apparatus 32 where the sulfur which has now been converted to $H_2S$ is removed. Steam 34 is added to the effluent and passed to the reform reactor 36. The effluent 38 from the reform reactor is cooled by heat exchanger 40 to 350° F. (176° C.). At this temperature it enters the shift converter 42 where additional molecular hydrogen is formed during an exothermic reaction resulting in a fuel temperature of 450° F. (232° C.) for the reform fuel exiting at location 44. This fuel is then passed to fuel cells 46 for the generation of electric power.

Referring to FIG. 2, the recycle stream 14 enters at a temperature of 450° F. (232° C.). While the fresh fuel 10 enters at a temperature of 60° F. (20° C.). These two streams are mixed within the catalytic bed 16. The volume contained within line 52 is substantially at 450° F. (232° C.). Isotherm 54 represents the 350° F. (176° C.) zone and isotherm 56 represents the 250° F. (120° C.) zone. The 140° F. mix temperature is shown substantially by isotherm 60.

While this center cone is at 450° F. (232° C.), it contains no oxygen, at the edge of the cone the recycle gas mixes with and heats only a portion of the incoming fuel 10. With an auto ignition temperature of 175° F. (80° C.) it can be seen that the center portion of the bed would readily autoignite in the presence of oxygen in the incoming fuel. With 4 percent oxygen content the exothermic action will spread throughout the bed resulting in a temperature rise throughout the bed of 500° F. (278° C.) from the theoretical mixed temperature of 140° F. (60° C.), yielding an outlet temperature of 640° F. (338° C.). Even with the sulfided catalyst having an ignition temperature of 250° F. (120° C.) autoignition will readily occur.

It can be appreciated that at very low oxygen concentrations, autoignition will still take place adjacent the central cone. However, if the oxygen concentration is so low that even with the reaction taking place, insufficient heat is generated to heat the diluting incoming stream above the autoignition temperature only a portion of the oxygen will be consumed. However, with the mixed temperature of 140° F. (60° C.) and an autoignition temperature of 175° F. (80° C.), only 35 (19° C.) degrees temperature rise is required to theoretically autoignite the entire flow. This represents an oxygen concentration of 0.26 percent. Even with lower oxygen concentrations than that a portion of the oxygen will be consumed adjacent the central cone.

Using 250° F. (120° C.) as the ignition temperature for a sulfided ignition point the equivalent calculation results in a minimum oxygen concentration of 0.88 percent for theoretically complete consumption of the oxygen. Since, however, the sulfide will be burned off once the ignition starts it is believed that this is a very temporary maximum point.

Even with 0.88 percent and a sulfided theoretical bed, a large portion of this oxygen will be consumed in the central core of the bed. Assuming that it is possible for 0.8 percent of the oxygen to slip through the bed, this represents a 100° F. (56° C.) temperature increase. If the oxygen were thereafter consumed in the hydrodesulfurizer, the temperature within the hydrodesulfurizer would rise only from 500° to 600° F. (260° to 326° C.) while the slip oxygen is being consumed. It can therefore be seen that while it is possible for some oxygen to slip through this oxidizer, it is not possible for enough oxygen to slip to damage the operation of the system.

In a worst case situation with 4 percent oxygen and a 140° F. (60° C.) theoretical mix temperature, the temperature leaving the oxidizer will be 640° F. (338° C.). This temperature can be tolerated in the hydrodesulfurizer without cooling of the fuel. It should be noted that in this case of high oxygen consumption, either the oxygen is entirely consumed because of the high temperature of the reaction or if it were not so consumed, the temperature would be lower.

Heat exchanger 20 remains in place because of its need in the absence of oxygen. If, however, the heating surface 30 is sized and the heating fluid passing through that surface has an inlet temperature less than 650° F. (348° C.), the heat exchanger becomes substantially inoperative because of the loss of log mean temperature difference between the heating fluid and the fuel being heated. If such a selection is made, the heat exchanger may operate without the requirements to impose a control system thereon.

The bed of catalyst is in fact a very good vehicle for mixing the flow 14 of the recycle flow and the fuel 10. However, it is possible for some oxygen to slip through without mixing with the remaining gas, this being little more possible along the inner surface 62 of vessel 99. It should be noted in speaking of mixing, that it is not a complete mixing of all the gas that is required, but sufficiently enough mixing of the cold incoming fuel 10 with any of the surrounding gas to raised the mixture above the ignition temperature. Accordingly, a helical vane 64 is located on the inner wall 62 to encourage additional transverse movement of the gas flow and some rotational movement.

What is claimed is:

1. A fuel reforming apparatus for a fuel cell tolerant of variations in oxygen content in the fresh fuel supply comprising:

means defining an oxidizer containing a catalyst for catalyzing an oxidation reaction consuming oxygen, and having a minimum ignition temperature;

a fuel supply means for supplying fresh fuel to said oxidizer;

means defining hydrodesulfurizer connected to said oxidizer means for receiving fuel from said oxidizer for converting sulfur to $H_2S$ and a removal device connected for receiving fuel from said hydrodesulfurizer for removing $H_2S$ from said fuel;

a reform reactor connected for receiving fuel from said $H_2S$ removal device for increasing the molecular hydrogen content of the fuel;

a recycle means for returning a recycled portion of the reformed fuel from a location downstream of said reform reactor to said oxider means; and said oxidizer means including means arranged for heating only a portion of said fresh fuel comprising means for initially mixing said recycled portion with only a portion of said fresh fuel and exposing this portion to the catalyst, and for thereafter heating the remaining fresh fuel in the presence of the catalyst.

2. A fuel reforming apparatus as in claim 1:

a heat exchanger for transferring heat to said fresh fuel at a location between said oxidizer means and said hydrodesulfurizer means.

3. A fuel reforming apparatus as in claim 2:

said heat exchanger having as the heating source a fluid having a temperature less than the maximum tolerable temperature in the hydrodesulfurizer.

4. A fuel reforming apparatus as in claim 1:

said mixing means and said oxidizer means comprising a vessel containing a bed of catalyst, a conduit directing said recycled portion into said bed at a first location, and a conduit for directing said fuel into said bed at a second location surrounding said first location.

5. A fuel reforming apparatus as in claim 4:

said first location being central within said cylindrical vessel; and said second location annularly surrounding said first location.

6. A fuel reforming apparatus as in claim 5:

mixing vanes located within said vessel within said catalyst bed at a location remote from said first location.

7. A fuel reforming apparatus as in claim 5:

said mixing vanes comprising helical vanes located adjacent said vessel wall.

* * * * *